United States Patent
Nylund et al.

(10) Patent No.: US 9,632,693 B2
(45) Date of Patent: Apr. 25, 2017

(54) TRANSLATION OF TOUCH INPUT INTO LOCAL INPUT BASED ON A TRANSLATION PROFILE FOR AN APPLICATION

(75) Inventors: Mark Edward Nylund, Berthoud, CO (US); Derek Lukasik, Fort Collins, CO (US); Jeffrey Joel Walls, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 248 days.

(21) Appl. No.: 14/384,249

(22) PCT Filed: May 29, 2012

(86) PCT No.: PCT/US2012/039805
§ 371 (c)(1),
(2), (4) Date: Sep. 10, 2014

(87) PCT Pub. No.: WO2013/180687
PCT Pub. Date: Dec. 5, 2013

(65) Prior Publication Data
US 2015/0026586 A1    Jan. 22, 2015

(51) Int. Cl.
*G06F 3/0488* (2013.01)
*H04L 29/08* (2006.01)

(52) U.S. Cl.
CPC .......... *G06F 3/0488* (2013.01); *H04L 67/025* (2013.01)

(58) Field of Classification Search
CPC .................................................. G06F 3/0484
See application file for complete search history.

(56) References Cited

U.S. PATENT DOCUMENTS

| | | | |
|---|---|---|---|
| 6,020,881 A | 2/2000 | Naughton et al. | |
| 7,870,496 B1 | 1/2011 | Sherwani | |
| 8,269,728 B2 | 9/2012 | Bolt et al. | |
| 2003/0217166 A1* | 11/2003 | Dal Canto | H04L 63/0272 709/229 |

(Continued)

FOREIGN PATENT DOCUMENTS

| | | |
|---|---|---|
| CN | 101321251 | 12/2008 |
| CN | 101447998 | 6/2009 |

(Continued)

OTHER PUBLICATIONS

Eric Torunski et al., "Gesture Recognition on a Mobile Device for Remote Event Generation," Multimedia Communications Research Laboratory (MCRLab);Distributed & Collaborative Virtual Environments Research Laboratory (DISCOVER);University of Ottawa, Ontario, Canada Jul. 11-15, 2011, pp. 1-6, IEEE.

(Continued)

*Primary Examiner* — David Choi
(74) *Attorney, Agent, or Firm* — HP Inc. Patent Department (57) ABSTRACT

Examples disclosed herein relate to translation of touch input into local input based on a translation profile for an application. Examples include translating touch input into local input based on a translation profile for an application in focus, if the translation profile is accessible. Examples further include providing the touch input to an operating system if no translation profile for the application in focus is accessible and the operating system is able to utilize touch input.

13 Claims, 4 Drawing Sheets

(56) References Cited

U.S. PATENT DOCUMENTS

| | | | |
|---|---|---|---|
| 2005/0273700 A1 | 12/2005 | Champion et al. | |
| 2006/0064472 A1 | 3/2006 | Mirho | |
| 2009/0128516 A1* | 5/2009 | Rimon | G06F 3/0412 345/174 |
| 2009/0153289 A1 | 6/2009 | Hope et al. | |
| 2010/0169842 A1 | 7/2010 | Migos | |
| 2010/0268762 A1 | 10/2010 | Pahlavan et al. | |
| 2010/0269039 A1 | 10/2010 | Pahlavan et al. | |
| 2010/0293499 A1 | 11/2010 | Young et al. | |
| 2011/0050569 A1 | 3/2011 | Marvit et al. | |
| 2011/0214063 A1 | 9/2011 | Saul | |
| 2011/0314093 A1 | 12/2011 | Sheu et al. | |
| 2012/0084670 A1 | 4/2012 | Momchilov | |
| 2012/0092277 A1* | 4/2012 | Momchilov | G06F 3/038 345/173 |
| 2012/0127089 A1* | 5/2012 | Waas | G06F 3/04883 345/173 |
| 2012/0127206 A1* | 5/2012 | Thompson | G06F 3/038 345/661 |
| 2012/0226742 A1 | 9/2012 | Momchilov et al. | |
| 2013/0073670 A1* | 3/2013 | Das | G06F 9/5027 709/217 |
| 2015/0026586 A1* | 1/2015 | Nylund | H04L 67/025 715/740 |

FOREIGN PATENT DOCUMENTS

| | | |
|---|---|---|
| CN | 101673185 | 3/2010 |
| CN | 102193732 | 9/2011 |

OTHER PUBLICATIONS

Felipe Gil-Castineira and Raja Bose, "Remote Virtual Peripheral Framework: Enabling Dynamically Composed Devices," The 8th Annual IEEE Consumer Communications and Networking Conference—Emerging and Innovative Consumer Technologies and Applications; Jan. 9-12, 2011, pp. 405-409, IEEE.

International Search Report and Written Opinion, International Application No. PCT/US2012/039805, Date of Mailing: Dec. 28, 2012, pp. 1-8.

Bob Rankin, "OnLive Desktop—Windows on Your Tablet?," Apr. 27, 2012, Ask Bob Rankin, (web page), <http://askbobrankin.com/onlive_desktop_windows_on_your_tablet.html>.

Citrix Online, "GoToMyPC (Remote Desktop)." available Nov. 29, 2011, available at: <http://itunes.apple.com/us/app/gotomypc-remote-desktop/id417742726>.

Citrix Systems, Inc., "Citrix Receiver for Enterprise Applications—The technical detail," Apr. 2010, available at: <http://www.citrix.com/site/resources/dynamic/partnerDocs/Receiver_EntApps_TechWP_Apr2010.pdf>.

Citrix Systems, Inc., "Citrix Receiver Product Overview," Jan. 2012, available at: <http://www.citrix.com/site/resources/dynamic/salesdocs/Citrix_Receiver_-_Product_O[1].pdf>.

Citrix Systems, Inc., "Citrix Receiver, for iPhone 3GS, iPhone 4, iPhone 4S, iPod touch (3rd generation), iPod touch (4th generation) and iPad on the iTunes App Store," Available at: <http://itunes.apple.com/us/app/citrix-receiver-for-ipad/id363501921?mt=8>, retrieved May 1, 2012.

David Pogue, "Windows on the iPad, and Speedy," Feb. 22, 2012, The New York Times, <http://www.nytimes.com/2012/02/23/technology/personaltech/onlive-desktop-plus-puts-windows-7-on-the-ipad-in-blazing-speed-state-of-the-art?_r=0>.

Elusiva, "Remote Desktop Client," available Jul. 10, 2011, available at: <http://web.archive.org/web/20110710184524/http://www.elusiva.com/products/RemoteDesktopClient.aspx>, retrieved May 4, 2012.

Harish et al., How can I enable touch screen control with remote desktop, Microsoft Answer, Jan. 5, 2012, available at: <http://answers.microsoft.com/en-us/windows/forum/windows_7-windows_programs/how-can-I-enable-touch-screen-control-with-remote/26049967-4537-49b6-87c2-8c36c6c25e8a?msgld=8a3b11f1-4e04-4a00-a6a5-b05998e7d807>.

Hewlett-Packard Development Company, LP, "Advantages and Implementation of HP Remote Graphics Software." Apr. 2009, available at: <http://h20331.www2.hp.com/Hpsub/downloads/RGS_WP_April09.pdf>.

Hewlett-Packard Development Company, LP, "QuickSpecs: HP Remote Graphics Software 5.4.7," available at: <http://h20331.www2.hp.com/hpsub/downloads/RGS_QS_5-4-7_feb7.pdf>, retrieved on May 1, 2012.

Hewlett-Packard Development Company, LP, "Remote Graphics Software," Data Sheet, May 2010, available at: <http://h20331.www2.hp.com/Hpsub/downloads/HP%20RGS_Data_Sheet%20070210.pdf>.

IOSPIRIT GmbH, "Remote Buddy AJAX Remote," Oct. 1, 2011, <http://web.archive.org/web/20111001071100/http://www.iospirit.com/products/remotebuddy/ajaxremote#overview>.

IOSPRIT GmbH, "Remote Buddy," May 16, 2012, <http://web.archive.org/web/20120516145049/http://www.iospirit.com/products/remotebuddy/>.

IOSPIRITGbmH, "iPhone/iPod Touch as Mac gesture remote control using Remote Buddy," video, Aug. 5, 2009, available at: <http://www.youtube.com/watch?v=m1Mc4EywML0>.

Lisa Phifer, "Citrix GoToMyPC Coporate Technology," Citrix Online, 2004, available at: <http://www.gotomypc.com/downloads/pdf/m/GoToMyPC_Corporate_Technology_White_Paper.pdf>.

Lisa Phifer, "GoToMyPC Technology Making Life Simpler for Remote and Mobile Workers," Citrix Online, 2010, available at: <http://www.gotomypc.com/remote_access/images/pdf/GoToMyPC_Overview_White_Paper.pdf>.

Splashtop Remote—Support, "Bring back the Video Mode," Nov. 27, 2010, available at: <http://support-remote.splashtop.com/entries/343391-bring-back-the-video-mode>.

Splashtop Support, "What are the various screen-control gestures that can be used during a Splashtop Remote session?," Sep. 20, 2010, available at: <http://support.remote.splashtop.com/entries/266353-what-are-the-various-screen-control-gestures-that-can-be-used-during-a-splashtop-remote-session>.

WYSE Technology, Inc., "PocketCloud Remote RDP / VNC," Google play, available at: <https://play.google.com/stores/apps/details?id=com.wyse.pocketcloudfree&feature=search_result>, available as of Feb. 7, 2012.

IOSPRITGmbH, "iPhone/iPod Touch as Mac gesture remote control using Remote Buddy," (video image and voice-over excerpts), Aug. 5, 2009, available at: <http://www.youtube.com/watch?v=m1Mc4EywML0>.

OnLive, "OnLive Desktop Plus," (video image excerpts and voice-over transcript), Feb. 29, 2012, <http://www.youtube.com/watch?v=2FBZX-vbhN8>.

* cited by examiner

TRANSLATION OF TOUCH INPUT INTO LOCAL INPUT BASED ON A TRANSLATION PROFILE FOR AN APPLICATION

BACKGROUND

A computing device such as a desktop computer, notebook computer, or tablet computer may provide a graphical user interface (GUI) for user interaction with content of the computing device. Such computing devices may enable a user to navigate between windows of the GUI and interact with content displayed in the windows using at least one input device, such as a mouse, a keyboard, or the like. In some examples, a computing device may be accessed remotely using another device to view and interact with the GUI of the computing device.

BRIEF DESCRIPTION OF THE DRAWINGS

The following detailed description references the drawings, wherein.

DETAILED DESCRIPTION

As noted above, a computing device may be accessed remotely using another device to view and interact with a graphical user interface (GUI) of the computing device. For example, applications at a local computing device may be accessed over a computer network using a remote computing device to view and interact with a GUI of the local computing device. In some examples, the remote computing device may include a touch-sensitive display capable of receiving touch input. In such examples, it may be desirable to allow a user to interact with applications at the local computing device using touch input at the remote computing device.

However, at least some of the applications at the local computing device may not support touch input. For example, many computation-intensive design and analysis applications for workstation computing devices do not recognize touch input from touch-sensitive displays. While it may be possible to develop a touch-enabled version of such an application, a single touch-enabled version may not be sufficient to work with each type of remote computing device. For example, different remote computing devices may have different touch input systems that recognize different touch actions (e.g., touch gestures) or have different actions mapped to the same touch actions. Additionally, developing a new, touch-enabled version of each application for each type of remote computing device input system may be costly and time consuming for application developers.

To address these issues, examples described herein provide a robust tool to enable interaction with both touch enabled and non-touch enabled applications at a local computing device using touch input at a remote computing device, without changing the local computing device applications. Examples described herein may translate touch input received from a remote computing device into local input usable by the local computing device (e.g., mouse or keyboard input) based on a translation profile associated with an application in focus at the local computing device at the time of the touch input. In such examples, application developers may provide touch input translation profiles for their applications rather than creating new, touch-enabled applications for use with touch systems, which may result in time and cost savings. In some examples, multiple translation profiles may be provided for a single application, with each of the profiles including translation information for a different remote computing device touch input system.

Additionally, examples described herein may provide received touch input to an operating system (OS) of the local computing device if no translation profile is available for the application in focus and the OS is able to natively process touch input. In some examples, the received touch input may alternatively be translated based on a translation profile associated with the local computing device OS if no translation profile is available for the application in focus and the OS is not able to natively process touch input. In this manner, examples described herein may utilize an application-specific translation profile for an application in focus, if available, and alternatively either use an OS translation profile or provide the touch input to the OS, depending on whether the OS can natively process touch information. As such, examples described herein may robustly provide for the use of touch input received from a remote computing device with applications at a local computing device.

Figure 1:
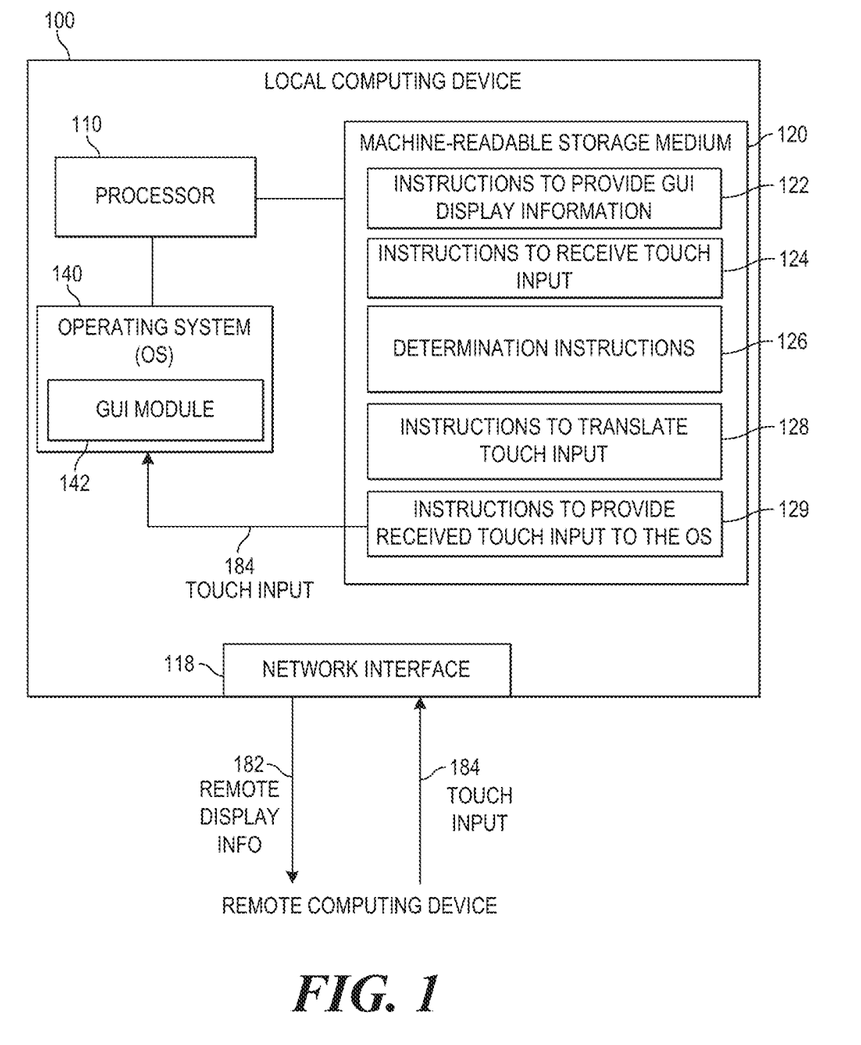
FIG. 1 is a block diagram of an example local computing device to receive touch input from a remote computing device.

Referring now to the drawings, FIG. 1 is a block diagram of an example local computing device 100 to receive touch input from a remote computing device. As used herein, a "computing device" may be a desktop or notebook computer, workstation, server, tablet computer, mobile phone, smart device, or any other device or equipment including a processor. In the example of FIG. 1, local computing device 100 includes a processor 110, a network interface 118, and a machine-readable storage medium 120 encoded with instructions 122, 124, 126, 128, and 129. In some examples, storage medium 120 may include additional instructions. In other examples, instructions 122, 124, 126, 128, 129, and any other instructions described herein in relation to storage medium 120 may be stored remotely from local computing device 100.

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 110 may fetch, decode, and execute instructions stored on storage medium 120 to implement the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage device to contain or store information such as executable instructions, data, and the like. For example, any machine-readable storage medium described herein may be any of Random Access Memory (RAM), flash memory, a storage drive (e.g., a hard disk), a Compact Disc Read Only Memory (CD-ROM), and the like, or a combination thereof.

Further, any machine-readable storage medium described herein may be non-transitory.

In the example of FIG. 1, local computing device 100 may also include an operating system (OS) 140 for local computing device 100. OS 140 may include a graphical user interface (GUI) module 142 that may implement a GUI on local computing device 100. GUI module 142 may generate local display information for output on a local display, such as an integral display of local computing device 100 or a display connected to a local peripheral interface of local computing device 100 (e.g., a local port or bus). In some examples, the functionalities of OS 140 and module 142 may be implemented in the form of executable instructions encoded on a machine-readable storage medium, in the form of electronic circuitry, or a combination thereof.

In some examples, instructions 122 may provide remote display information 182 to a remote computing device with network interface 118 of local computing device 100. The remote display information 182 may be useable by the remote computing device to display at least a portion of the GUI of local computing device 100. In some examples, remote display information 182 may be provided to the remote computing device as part of a remote desktop protocol providing remote access to local computing device 100. In such examples, the remote computing device may be used to view and interact with a GUI (e.g., a desktop) of local computing device 100. The remote computing device may be any type of computing device, as described herein, that includes a touch-sensitive display. In some examples, instructions 122 may continuously derive remote display information 182 from local display information generated by GUI module 142 such that the remote computing device is able to use the remote display information 182 to continuously display at least a portion of the GUI of local computing device 100. For example, instructions 122 may continuously provide remote display information 182 during a given remote desktop session between local computing device 100 and the remote computing device.

As used herein, a "touch-sensitive display" may be any combination of hardware components capable of outputting a video signal and receiving user input in the form of touch. For example, a touch-sensitive display may include components of any display technology suitable for outputting a received video signal (e.g., remote display information) and may also include components for detecting touch, such as the components of, for example, a resistive, capacitive, surface acoustic wave, infrared, optical imaging, dispersive signal sensing, in-cell system, or the like. In examples described herein, a touch-sensitive display may output touch information identifying received user input.

As noted above, instructions 122 may provide remote display information 182 to the remote computing device with network interface 118. As used herein, a "network interface" is at least one hardware component that may be used by a computing device to communicate with at least one other computing device via a communications network including at least one computer network, at least one telephone network, or a combination thereof. In some examples, suitable computer networks include, for example, a local area network (LAN), a wireless local area network (WLAN), a virtual private network (VPN), the internet, and the like.

Instructions 124 may receive touch input 184 from the remote computing device with network interface 118. Received touch input 184 may identify a touch event sensed with a touch-sensitive display at the remote computing device when at least a portion of the GUI was being displayed with the touch-sensitive display. In some examples, the remote computing device may receive the remote display information 182 and, using that information, display at least a portion of the GUI of the local computing device on a touch-sensitive display of the remote computing device. In such examples, the touch-sensitive display may sense a touch event while displaying the portion of the GUI. In some examples, touch input 184 may be received from the remote computing device as part of a remote desktop protocol providing remote access to local computing device 100.

In some examples, the remote computing device may provide touch input to local computing device 100 in response to touch events sensed by a touch-sensitive display of the remote computing device. As used herein, a "touch event" may be an interaction between a touch-sensitive display and a finger, stylus, etc., that may be detected by the display. For example, placing a finger on the display, moving the finger across the display, and then lifting the finger from the display may be sensed by the display as three touch events, namely, a "touch-down" event, a "touch-move" event, and a "touch-up" event, respectively. In other examples, additional or other types of touch events may be sensed by the touch-sensitive display. In examples described herein, the types of touch events sensed by a touch-sensitive display may vary depending upon at least one of the type of device using the touch-sensitive display and the operating system of the device using the touch-sensitive display.

As used herein, "touch input" is information identifying at least one touch event sensed by a touch-sensitive display. In some examples, touch input may include, for each touch event identified in the touch input, an identification of the type of the touch event (e.g., touch-down, touch-move, touch-up, etc.) and the location of the touch event. The location information may identify a point or area of a GUI displayed on the touch-sensitive display where the touch event occurred, or a point or area of the display at which the touch event occurred. For example, touch input 184 may identify, for a touch event sensed at the touch-sensitive display, the type of the touch event and the location of the touch event within the local computing device GUI displayed, at least in part, on the touch-sensitive display. In some examples, touch input received from remote computing device may be touch information output by a touch-sensitive display of the remote computing device, or may be information derived from such touch information. Also, in some examples, the remote computing device may provide the touch input to local computing device 100 in a uniform touch input format. Additionally, remote computing device may provide touch input to local computing device 100 in a touch input message or communication.

In examples described herein, the manner in which the received touch input 184 is processed at local computing device 100 may depend upon at least one of whether OS 140 is able to utilize touch input and whether a translation profile is available for an application in focus at local computing device 100. In the example of FIG. 1, instructions 126 may determine whether OS 140 of local computing device 100 is able to utilize touch input. In some examples, instructions 126 may query OS 140 to determine whether OS 140 is able to utilize touch input. In other examples, instructions 126 may include a list of operating systems able to utilize touch input. In such examples, instructions 126 may query OS 140 to determine the identity of OS 140 and then determine whether OS 140 is able to utilize touch input based on whether OS 140 is included in the list. As used herein, an operating system is "able to utilize" touch input if the OS is able to receive and act upon touch input as a valid form of user input.

In the example of FIG. 1, instructions 126 may also determine an application in focus at local computing device 100 at the time of the touch event identified in touch input 184. For example, instructions 126 may query OS 140 to determine the application in focus at the time of the touch event. Instructions 126 may further determine whether a translation profile associated with the application in focus at the time of the touch event is accessible to local computing device 100. For example, instructions 126 may determine that a translation profile associated with the application in focus is accessible to local computing device 100 if such a translation profile is stored on local computing device 100 or is stored remotely from local computing device 100 at a location known to and accessible by local computing device 100. For example, instructions 126 may determine that a translation profile associated with the application in focus is accessible to local computing device 100 if the profile is stored at a known address which local computing device 100 is able to access via network interface 118.

As used herein, a "translation profile" is a collection of information including a mapping of touch input to at least one of local input useable by an operating system of a local computing device and command input usable by an application of the local computing device. Also, as used herein, a translation profile "associated with" or "for" a given application is a translation profile identified for use in connection with the given application. As used herein, "local input" useable by an operating system of a local computing device is information the operating system is able to receive and act upon as a valid form of user input. In some examples, the local input may be information emulating output from at least one type of input device (e.g., mouse, keyboard, etc.) whose output the operating system is able to receive and act upon as a valid form of user input. For example, a translation profile may include at least one mapping of touch input to local input emulating input from at least one of a mouse, a keyboard, or another input device. As used herein, "command input" of a translation profile associated with an application is at least one command useable by the application associated with the translation profile. In some examples, a translation profile may also include mappings of touch input to other touch input. Such mappings may be utilized if the OS of the local computing device is able to utilize touch input.

In some examples, a translation profile may include mappings from touch actions to local input. As used herein, a "touch action" is information identifying a given touch input or sequence of touch input for translation to local input. In some examples, a translation profile may include a plurality of touch actions each representing one of a plurality of single and multi-finger taps and touch gestures for translation into local input. In such examples, each of the touch actions includes information identifying the touch input or sequence of touch input defining the tap or touch gesture represented by the touch action.

As described above, instructions 126 may determine that a translation profile associated with the application in focus at the time of the touch event identified in touch input 184 is accessible to the local computing device 100. In response to that determination, instructions 128 may translate at least the received touch input 184 into local input useable by the OS based on the translation profile associated with the application in focus. In such examples, instructions 128 may identify a touch action of the translation profile corresponding to at least the received touch input. For example, instructions 128 may identify a touch action in the translation profile that matches the received touch input 184. In other examples, instructions 128 may identify a touch action in the translation profile that matches a sequence of touch input including the received touch input 184 in combination with other touch input received previously, other touch input received subsequently, or both. For example, the identified touch action may include information identifying a sequence of touch input defining a touch gesture, wherein the sequence includes the received touch input.

After identifying the touch action, instructions 128 may provide to OS 140 the local input mapped to the identified touch action in the translation profile for the application in focus. In some examples, the local input provided to OS 140 may include information emulating output of at least one input device whose input is useable by OS 140. For example, the local input may emulate at least one of mouse and keyboard input. In some examples, the local input mapped to the identified touch action may include information emulating a sequence of keystrokes output by a keyboard, wherein the sequence of keystrokes is defined to invoke a given function in the application in focus. For example, the sequence of keystrokes may be defined as a keyboard shortcut in the application in focus. For example, the identified touch action may include a sequence of touch input defining a two-finger pinch gesture, and the identified touch action may be mapped to local input emulating a sequence of keystrokes (e.g., the sequence "Alt", "z", "–") defined as a zoom-out shortcut in the application in focus. In such examples, instructions 128 may provide local input emulating the keyboard sequence to OS 140.

In other examples, instructions 126 may determine that no translation profile associated with the application in focus at the time of the touch event identified in touch input 184 is accessible to local computing device 100. In such examples, instructions 126 may also determine that OS 140 is able to utilize touch input. In response to these determinations, instructions 129 may provide received touch input 184 to OS 140. In some examples, instructions 129 may place touch input 184 in a message, function call, or other communication format recognized by OS 140 prior to providing it to OS 140. For example, instructions 129 may provide the received touch input 184 to OS 140 in an Application Programming Interface (API) message recognized by OS 140.

In still other examples, instructions 126 may determine that no translation profile associated with the application in focus at the time of the touch event identified in touch input 184 is accessible to local computing device 100 and that OS 140 is not able to utilize touch input. In response to such determinations, instructions 128 may translate at least the received touch input into local input useable by the OS, based on a translation profile associated with OS 140. Instructions 128 may translate the touch input to local input as described above in relation to the translation profile for the application in focus. In some examples, the translation profile associated with OS 140 may translate touch input into local input such as at least one of mouse input and keyboard input. The translation profile for OS 140 may be stored locally on local computing device 100 or may be accessible remotely from local computing device 100 (e.g., via network interface 118).

In some examples, instructions 126 may also determine a device type of the remote computing device. As used herein, a "device type" of a computing device is information identifying at least one of an operating system utilized by the computing device, other software utilized by the computing device, hardware components included in the computing device, a model of computing device, and a brand of the computing device. In some examples, instructions 126 may determine the device type of a remote computing device based on identifying information provided to local computing device 100 by the remote computing device. As noted above, instructions 126 may determine whether a translation profile associated with the application in focus at the time of the touch event is accessible to local computing device 100. In some examples, a plurality of translation profiles associated with an application of local computing device 100 may be provided for each of at least one application of local computing device 100. In such examples, different translation profiles associated with a given application may be associated with different device types. For example, each of the translation profiles associated with a given application may be associated with a different device type. In some examples, a translation profile may be associated with a plurality of device types. Additionally, in some examples, a default translation profile may be identified among the plurality of translation profiles associated with a given application. The plurality of translation profiles may be stored locally on local computing device 100 or remotely.

In such examples, after instructions 126 determine a device type of the remote computing device, instructions 126 may determine whether a translation profile associated with the application in focus and associated with the determined device type is accessible to local computing device 100. If so, then instructions 128 may translate at least the received touch input 184 based on the translation profile associated with the application in focus and the determined device type. If not, then instructions 126 may determine whether a default translation profile associated with the application in focus is available to local computing device 100. If so, then instructions 128 may translate at least the received touch input 184 based on the default translation profile associated with the application in focus. If instructions 126 determine that no translation profile associated with the application is accessible to local computing device 100, then the received touch input may be processed at local computing device 100 as described above. In some examples, functionalities described herein in relation to FIG. 1 may be provided in combination with functionalities described herein in relation to any of FIGS. 2-4.

Figure 2:
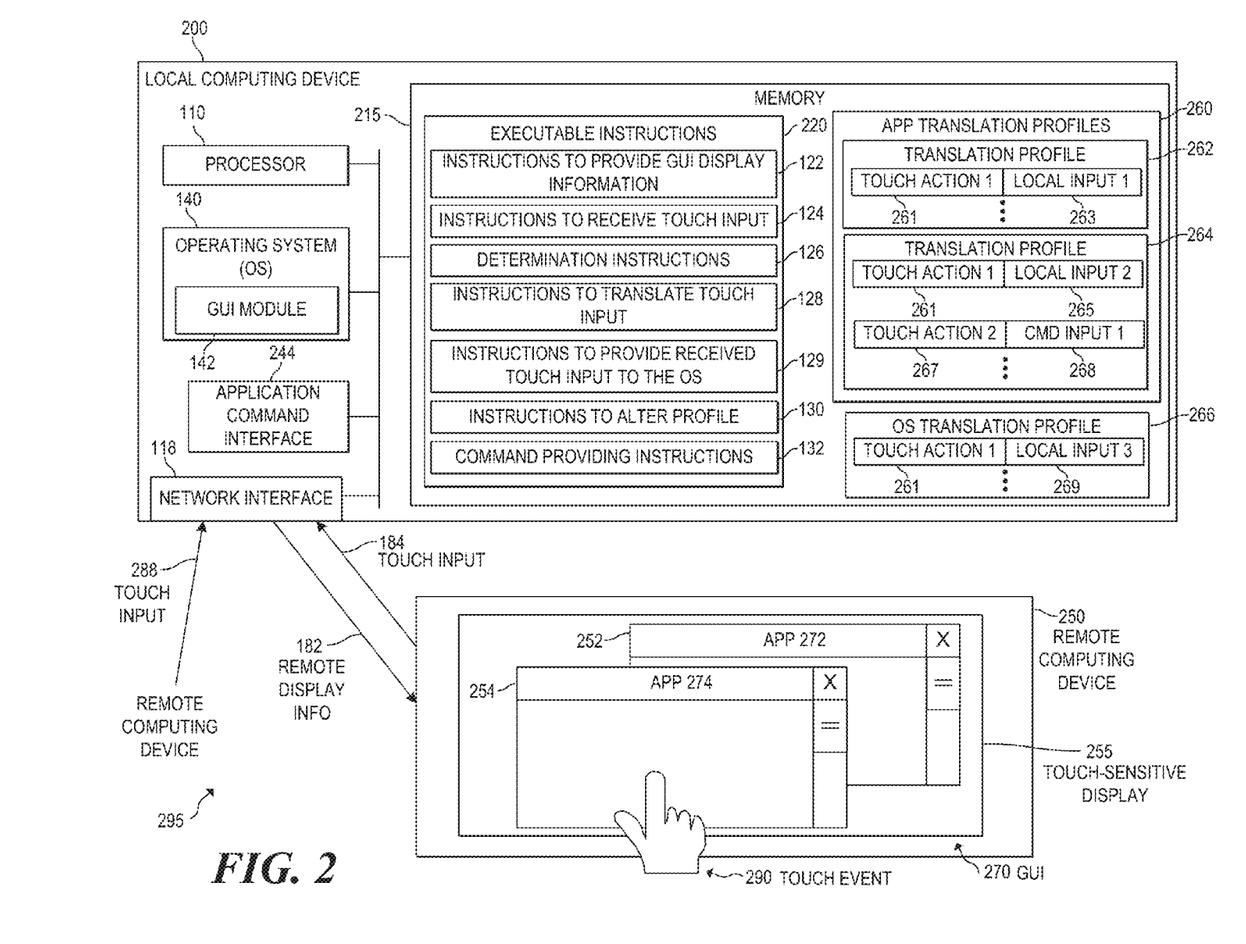
FIG. 2 is a block diagram of an example computing system to provide touch input to a local computing device with a remote computing device.

FIG. 2 is a block diagram of an example computing system 295 to provide touch input to a local computing device 200 with a remote computing device 250. In the example of FIG. 2, local computing device 200 may include a processor 110, a network interface 118, and an OS 140, as described above in relation to FIG. 1. Local computing device 200 may also include a memory 215, which may be a machine-readable storage medium. Memory 215 may be encoded with a set of executable instructions 220, including at least instructions 122, 124, 126, 128, and 129, as described above in relation to FIG. 1. Executable instructions 220 may also include instructions 130 and 132. In other examples, executable instructions 220 may include additional instructions. In the example of FIG. 2, processor 110 may fetch, decode, and execute instructions stored on memory 215 to implement the functionalities described below. In other examples, the functionalities of any of the instructions stored on memory 215 may be implemented in the form of electronic circuitry, in the form of executable instructions encoded on a machine-readable storage medium, or a combination thereof.

In the example of FIG. 2, remote computing device 250 may remotely access content of local computing device 200 over a communications network. For example, computing system 295 may implement a remote desktop system in which remote computing device 250 may remotely view and interact with a GUI (e.g., a desktop) of local computing device 200 to access content of local computing device 200. In the example of FIG. 2, instructions 122 may provide remote display information 182 to remote computing device 250 with network interface 118, as described above in relation to FIG. 1. In some examples, remote computing device 250 may receive remote display information 182 with a network interface of the remote computing device 250. Remote computing device 250 may also include a touch-sensitive display 255. In examples described herein, remote computing device 250 may be any type of computing device, as described herein, that includes a touch-sensitive display.

In the example of FIG. 2, remote display information 182 may be useable by remote computing device 250 to display at least a portion of a GUI 270 of local computing device 200 with touch-sensitive display 255. In some examples, instructions 122 may continuously derive remote display information 182 from local display information generated by GUI module 142 such that remote computing device 250 is able to use remote display information 182 received from local computing device 200 to continuously display at least a portion of the GUI 270 of local computing device 200 on touch-sensitive display 255. In the example of FIG. 2, the portion of GUI 270 displayed on touch-sensitive display 255 at a given time may include a window 252 for an application 272 of local computing device 200 and another window 254 for an application 274 of local computing device 200. At other times, other windows, icons, or other GUI objects may be displayed as part of the portion of GUI 270 displayed on touch-sensitive display 255.

In some examples, touch-sensitive display 255 may sense a touch event while displaying GUI 270, as described above in relation to FIG. 1. In the example of FIG. 2, touch-sensitive display 255 may sense a touch event 290 when a user taps touch-sensitive display 255 with a finger, stylus, or other object, for example. In response, remote computing device 250 may provide, to local computing device 200, touch input 184 identifying touch event 290. Remote computing device 250 may continually provide touch input 184 to local computing device 200 as touch-sensitive display 255 senses touch events.

In some examples, remote computing device 250 may provide each instance of touch input 184 to local computing device 200 in a uniform touch input format. Also, in some examples, local computing device 200 may receive touch input from a plurality of different remote computing devices in the same format. In the example of FIG. 2, for example, local computing device 200 may receive each instance of touch input 184 from remote computing device 250 in a uniform touch input format, and may receive each instance of touch input 288 from another remote computing device in the same uniform touch input format.

In the example of FIG. 2, instructions 124 may receive touch input 184 from remote computing device 250 with network interface 118. As noted above, the received touch input 184 may identify a touch event 290 sensed with touch-sensitive display 255 at remote computing device 250 when displaying the at least a portion of GUI 270 of local computing device 200. As described above, touch input 184 may identify the type of touch event 290 and a location of touch event 290. In the example of FIG. 2, touch event 290 occurred within window 254 of application 274. In such examples, touch input 184 may identify the location of touch event 290 as a point or area corresponding to a region where window 254 is displayed in GUI 270.

As described above in relation to FIG. 1, the manner in which the received touch input 184 is processed at local computing device 200 may depend upon at least one of whether OS 140 is able to natively process touch input and whether a translation profile is available for an application in focus at local computing device 200. As used herein, an operating system is able to "natively process" input if the operating system is able to receive and act upon the input as a valid form of user input. Instructions 126 may determine whether OS 140 of local computing device 100 is able to natively process touch input as described above in relation to determining with instructions 126 whether an OS is able to utilize touch input.

In response to receiving touch input 184, instructions 126 may further determine an application in focus at local computing device 200 at the time of the touch event identified in touch input 184, as described above in relation to FIG. 1. In the example of FIG. 2, instructions 126 may determine that the application in focus at local computing device 200, at the time of touch event 290 identified in touch input 184, is application 274 displayed in window 254 of GUI 270 at the time of touch event 290.

After determining the application in focus, instructions 126 may also determine whether a translation profile associated with the application in focus at the time of the touch event is accessible to local computing device 200, as described above in relation to FIG. 1. In some examples, local computing device 200 may store, in memory 215, a plurality of translation profiles 260 each associated with an application of local computing device 200. In other examples, the plurality of translation profiles 260 may be stored on another machine-readable storage medium of local computing device 200 separate from memory 215.

In such examples, instructions 126 may determine that a translation profile associated with the identified application in focus is accessible to local computing device 200 if a translation profile associated with the application in focus is included among the plurality of translation profiles 260 stored at local computing device 200. For example, instructions 126 may determine that a translation profile associated with the identified application 274 in focus at the time of the touch event 290 identified in touch input 184 is accessible to local computing device 200 if a translation profile associated with application 274 (e.g., a translation profile 264) is stored at local computing device 200. In other examples, instructions 126 may determine that such a translation profile is accessible to local computing device 200 if local computing device 200 is able to access a remotely stored translation profile associated with the application (e.g., via network interface 118), as described above in relation to FIG. 1.

In the example of FIG. 2, the plurality of translation profiles 260 may include at least one translation profile for each of at least one application of local computing device 200. For example, translation profiles 260 may include a translation profile 262 associated with application 272 and a translation profile 264 associated with application 274. Although FIG. 2 shows two translation profiles among the plurality of translation profiles 260, the plurality of translation profiles 260 may include more than two translation profiles. In some examples, the plurality of translation profiles 260 may include multiple translation profiles associated with each of at least one of the applications. For example, for some applications of local computing device 200, the plurality of translation profiles 260 may include multiple translation profiles associated with the application, such as different translation profiles associated with different device types, as described above in relation to FIG. 1.

In the example of FIG. 2, each translation profile of the plurality 260 includes a mapping of at least one touch action to at least one of local input and command input. In examples described herein, a translation profile may map each touch action included therein to local input, map each touch action included therein to command input, or include both mappings of touch actions to local input and mappings of touch actions to command input. In some examples, different translation profiles may include different mappings. For example, different translation profiles may map the same touch action to different local input, include mappings for different collections of touch actions, or both.

In the example of FIG. 2, translation profile 262 associated with application 272 and translation profile 264 associated with application 274 each include a mapping of at least one touch action to local input and, for at least one touch action, may each map the same touch action to different local input. For example, as shown in FIG. 2, translation profile 262 may map a first touch action 261 to first local input 263 and translation profile 264 may map first touch action 261 to a second local input 265 different than the first touch action 261. In the example of FIG. 2, translation profile 264 may also include a mapping of a second touch action 267 to first command input 268. Translation profiles 262 and 264 may include additional mappings in some examples.

If instructions 126 determine that a translation profile associated with the application in focus at the time that touch event 290 was sensed by touch-sensitive display 255, then local computing device 200 may use the translation profile to process the received touch input 184. For example, if the translation profile includes a mapping of a touch action including at least the received touch input 184 to local input that OS 140 of local computing device 200 is able to natively process, then instructions 128 may translate the touch input into local input based on the first translation profile associated with the application in focus.

In the example of FIG. 2, for example, instructions 126 may determine that translation profile 264 associated with application 274 is accessible and determine that first touch action 261 includes at least touch input 184 (i.e., matches touch input 184 alone or matches touch input 184 in combination with at least one of touch input received previously and touch input received subsequently). In such examples, instructions 128 may translate at least touch input 184 into second local input 265 to which the first touch action 261 is mapped and provide the second local input 265 to OS 140. In some examples, second local input 265 may implement a macro for the application associated with translation profile 264. In such examples, the second local input 265, when provided to OS 140, may trigger a defined sequence of actions in the application. In such examples, a user may invoke the macro implemented by second local input 265 by performing the touch action 261 mapped to second local input 265.

Alternatively, if the translation profile maps the touch action including at least touch input 184 to command input, then instructions 132 may provide the command input to which the touch input is mapped to the application in focus via an application command interface 244. In the example of FIG. 2, for example, instructions 126 may determine that translation profile 264 associated with application 274 is accessible and determine that second touch action 267 includes at least touch input 184 (i.e., matches touch input 184 alone or matches touch input 184 in combination with at least one of touch input received previously and touch input received subsequently). In such examples, instructions 132 may translate at least touch input 184 into first command input 268 to which the second touch action 265 is mapped and provide the first command input 268 to the application in focus (i.e., application 274) via application command interface 244. In such examples, application command interface 244 may be an interface for providing commands to applications executing on a computing device independent of the operating system of the computing device. In some examples, the functionalities of application command interface 244 may be implemented in the form of executable instructions encoded on a machine-readable storage medium, in the form of electronic circuitry, or a combination thereof.

In other examples, instructions 126 may determine both that OS 140 is able to natively process touch input and that no translation profile associated with the application in focus at the time of the touch event 290 identified in touch input 184 is accessible to local computing device 200. In such examples, instructions 129 may provide received touch input 184 to OS 140, as described above in relation to FIG. 1. In still other examples, instructions 126 may determine both that OS 140 is not able to natively process touch input and that no translation profile associated with the application 274 in focus at the time of touch event 290 identified in touch input 184 is accessible to local computing device 200. In such examples, instructions 128 may translate at least the received touch input 184 into local input OS 140 is able to natively process, based on a translation profile associated with OS 140. In the example of FIG. 2, a translation profile 266 associated with OS 140 is stored in memory 215 of local computing device 200. In other examples, translation profile 266 may be stored on local computing device 200 on a machine-readable storage medium separate from memory 215 or remotely from local computing device 200. In the example of FIG. 2, translation profile 266 includes a mapping of first touch action 261 to third local input 269, which is different than local input 263 and local input 265. In such examples, translation profile 266 may map a touch action to different local input than at least one translation profiles associated with an application of local computing device 200.

Additionally, in some examples, instructions 130 may receive a translation profile alteration request specifying one of the plurality of translation profiles 260. In some examples, the alteration request may be received via at least one local input device (e.g., mouse, keyboard, etc.) of local computing device 200. In response to receiving the request, instructions 130 may alter the specified translation profile in accordance with the received request. For example, the request may specify at least one alteration to be made to the specified translation profile, such as adding a new mapping of a touch input to one of a local input or command input, changing a current mapping of for a given touch action, or deleting a mapping for a given touch action. In such examples, the translation profiles may be configurable by a user of local computing device 200. In some examples, functionalities described herein in relation to FIG. 2 may be provided in combination with functionalities described herein in relation to any of FIGS. 1 and 3-4.

Figure 3:
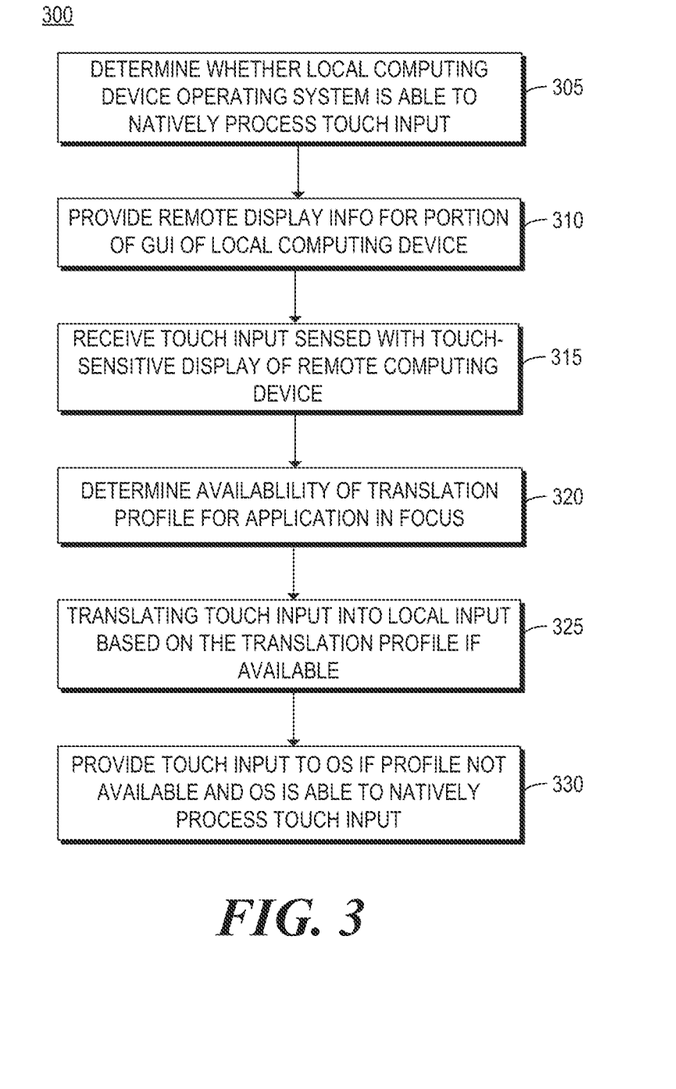
FIG. 3 is a flowchart of an example method for translating touch input to local input based on a translation profile.

FIG. 3 is a flowchart of an example method 300 for translating touch input to local input based on a translation profile. Although execution of method 300 is described below with reference to computing device 200 of FIG. 2, other suitable components for execution of method 300 can be utilized (e.g., computing device 100). Additionally, method 300 may be implemented in the form of executable instructions encoded on a machine-readable storage medium, in the form of electronic circuitry, or a combination thereof.

At 305 of method 300, local computing device 200 may determine whether OS 140 is able to natively process touch input. At 310, local computing device 200 may provide remote display information 182 to remote computing device 250 with network interface 118. In some examples, the remote display information 182 may be useable to display at least a portion of a GUI of local computing device 200 at remote computing device 250. For example, remote display information 182 may be useable to display at least a portion of the GUI with touch-sensitive display 255. At 315, local computing device 200 may receive touch input 184 with network interface 118. In some examples, touch input 184 may indicate a touch event sensed with touch-sensitive display 255 of remote computing device 250 when displaying at least a portion of the GUI of local computing device 200.

At 320, local computing device 200 may determine whether a translation profile associated with an application in focus at local computing device 200 at the time of the touch event identified in touch input 184 is accessible to local computing device 200. For example, local computing device 200 may query OS 140 to determine what application is in focus at local computing device 200 at the time of the identified touch event, and may further determine whether a translation profile associated with the application in focus is accessible to local computing device 200, as described above in relation to FIG. 1.

At 325 of method 300, if a translation profile associated with the application in focus is accessible to local computing device 200, then local computing device 200 may translate at least the received touch input 184 into local input that OS 140 is able to natively process, based on the translation profile associated with the application in focus. At 330, if no translation profile for the application in focus is accessible to local computing device 200 and the OS is able to natively process touch input, then local computing device 200 may provide the received touch input 184 to OS 140.

Figure 4:
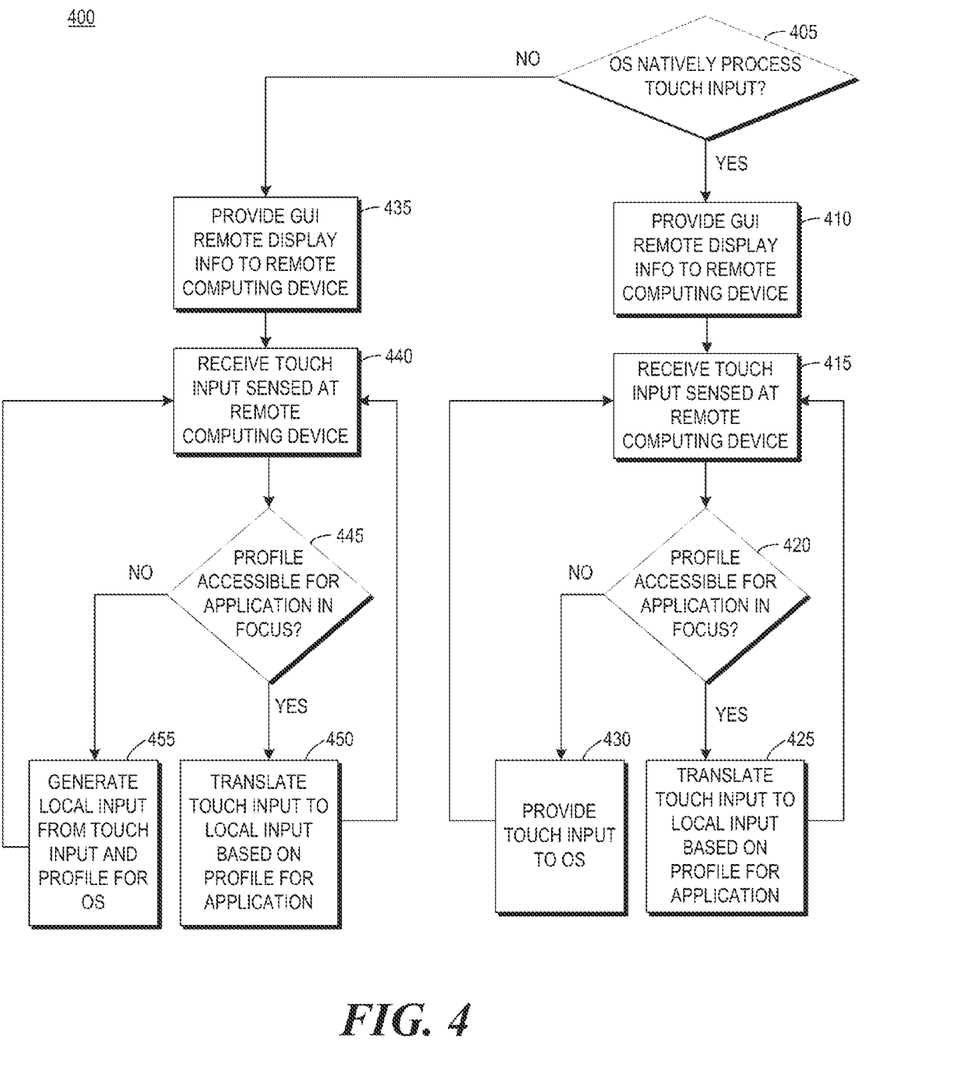
FIG. 4 is a flowchart of an example method for determining whether to translate touch input into local input at a local computing device.

FIG. 4 is a flowchart of an example method 400 for determining whether to translate touch input into local input at a local computing device. Although execution of method 400 is described below with reference to computing device 200 of FIG. 2, other suitable components for execution of method 400 can be utilized (e.g., computing device 100). Additionally, method 400 may be implemented in the form of executable instructions encoded on a machine-readable storage medium, in the form of electronic circuitry, or a combination thereof.

At 405 of method 400, local computing device 200 may determine whether OS 140 is able to natively process touch input, as described above in relation to FIG. 1. If so, method 400 may proceed to 410, where local computing device 200 may provide remote display information 182 to remote computing device 250 with network interface 118. In some examples, the remote display information 182 may be useable to display at least a portion of a GUI of local computing device 200 at remote computing device 250. For example, remote display information 182 may be useable to display at least a portion of the GUI with touch-sensitive display 255. At 415, local computing device 200 may receive touch input 184 with network interface 118. In some examples, touch input 184 may indicate a touch event sensed with touch-sensitive display 255 of remote computing device 250 at a time when at least a portion of the GUI of local computing device 200 was being displayed with touch-sensitive display 255.

At 420, local computing device 200 may determine whether a translation profile associated with an application in focus at local computing device 200 at the time of the touch event identified in touch input 184 is accessible to local computing device 200, as described above in relation to FIG. 1. For example, local computing device 200 may determine that application 274 is in focus at local computing device 200 at the time of the identified touch event 290, and may further determine whether a translation profile associated with application 274 is accessible to local computing device 200. If so, method 400 may proceed to 425, where local computing device 200 may translate at least the received touch input 184 into local input that OS 140 is able to natively process, based on the translation profile associated with the application in focus (e.g., application 274). Local computing device 200 may provide the generated local input to OS 140. Local computing device 200 may provide the generated local input to OS 140. Method 400 may then proceed to 415 to receive further touch input 184. If it is determined at 420 that no translation profile for the application in focus (e.g., application 274) is accessible to local computing device 200, then method 400 may proceed to 430, where local computing device 200 may provide the received touch input 184 to OS 140. Method 400 may them proceed to 415 to receive further touch input 184.

Returning to 415 of method 400, local computing device 200 may receive, with network interface 118, other touch input 184 indicating another touch event 290 (e.g., a subsequent touch event 290) sensed with touch-sensitive display 255 at least a portion of the GUI of local computing device 200 was being displayed with display 255. In some examples, the subsequent touch event 290 may occur when another application is in focus at local computing device 200, such as application 272, for example. In such examples, method 400 may proceed to 420, where local computing device 200 may determine whether a translation profile associated with application 272, which is in focus at local computing device 200 at the time of the subsequent touch event 290, is accessible to local computing device 200.

If so, method 400 may proceed to 425, where local computing device 200 may translate at least the received other touch input 184 into local input OS 140 is able to natively process, based on a translation profile associated with application 272. Local computing device 200 may provide the generated local input to OS 140. Method 400 may them proceed to 415 to receive further touch input 184. If not, method 400 may proceed to 430, where local computing device 200 may provide the other touch input 184 to OS 140. Method 400 may them proceed to 415 to receive further touch input 184.

If local computing device 200 determines at 405 that OS 140 is not able to natively process touch input, method 400 may proceed to 435, where local computing device 200 may provide remote display information 182 to remote computing device 250 with network interface 118. As described above, the remote display information 182 may be useable to display at least a portion of a GUI of local computing device 200 at remote computing device 250. For example, remote display information 182 may be useable to display at least a portion of the GUI with touch-sensitive display 255. At 440, local computing device 200 may receive, with network interface 118, touch input 184 indicating a touch event 290 sensed with touch-sensitive display 255 of remote computing device 250 at a time when at least a portion of the GUI of local computing device 200 was being displayed with touch-sensitive display 255.

At 445, local computing device 200 may determine whether a translation profile associated with an application in focus at local computing device 200 at the time of the touch event 290 identified in touch input 184 is accessible to local computing device 200, as described above in relation to FIG. 1. If so, method 400 may proceed to 450, where local computing device 200 may translate at least the received touch input 184 into local input that OS 140 is able to natively process, based on the translation profile associated with the application in focus. Local computing device 200 may provide the generated local input to OS 140. Method 400 may then proceed to 440 to receive further touch input 184. If it is determined at 445 that no translation profile for the application in focus is accessible to local computing device 200, then method 400 may proceed to 455, where local computing device 200 may generate, from at least the received touch input 184 and a translation profile associated with OS 140, local input that OS 140 is able to natively process. Local computing device 200 may provide the generated local input to OS 140. Method 400 may then proceed to 440 to receive further touch input 184.

What is claimed is:

1. A non-transitory machine-readable storage medium encoded with instructions executable by a processor of a local computing device, the storage medium comprising instructions to:

provide, to a remote computing device with a network interface of the local computing device, remote display information useable to display at least a portion of a graphical user interface (GUI) of the local computing device;

receive, with the network interface, touch input identifying a touch event sensed with a touch-sensitive display at the remote computing device when displaying the at least a portion of the GUI;

determine an application in focus at the local computing device at the time of the touch event;

determine whether an application translation profile associated with the application in focus is accessible to the local computing device, wherein the application translation profile associated with the application in focus is one of a plurality of application translation profiles, each application translation profile in the plurality having a corresponding application;

in response to a determination that the application translation profile associated with the application in focus is accessible, translate at least the received touch input into local input useable by an operating system (OS) of the local computing device based on the application translation profile associated with the application in focus, wherein the application translation profile maps the touch input to a mouse or keyboard input that emulates the result of the touch input;

determine whether the OS is able to utilize touch input;

in response to a determination that no translation profile associated with the application in focus is accessible and a determination the OS is unable to utilize touch input, translate the received touch input into local input useable by the OS based on a general translation profile associated with the OS, wherein the plurality of application translation profiles have priority over the general translation profile; and in response to the determination that no translation profile associated with the application in focus is accessible and a determination that the OS is able to utilize touch input, provide the received touch input to the OS without use of the plurality of application translation profiles and without use of the general translation profile.

2. The storage medium of claim 1, further comprising:
instructions to determine a device type of the remote computing device,
wherein the application translation profile associated with the application in focus is associated with the determined device type, and is one of a plurality of translation profiles associated with the application in focus, wherein each of the plurality of translation profiles associated with the application in focus is associated with a different device type.

3. The storage medium of claim 1, wherein:
the instructions to translate based on the application translation profile comprise:
instructions to identify a touch action of the application translation profile corresponding to at least the received touch input; and
instructions to provide to the OS the local input mapped to the identified touch action in the application translation profile associated with the application in focus; and
the local input includes information emulating output of at least one input device whose output is useable by the OS.

4. The storage medium of claim 3, wherein the local input includes information emulating a sequence of keystrokes output by a keyboard, the sequence defined to invoke a given function in the application in focus.

5. The storage medium of claim 3, wherein the identified touch action may include information identifying a sequence of touch input defining a touch gesture, the sequence of touch input including the received touch input.

6. A local computing device comprising:
a memory encoded with a set of executable instructions;
a processor to execute the instructions, wherein the instructions, when executed, cause the processor to:
provide, to a remote computing device, information useable to display at least a portion of a graphical user interface (GUI) of the local computing device;
receive touch input identifying a touch event sensed with a display of the remote computing device when displaying the at least a portion of the GUI;
translate, based on an application translation profile for an application in focus at the local computing device at the time of the touch event, a touch action including at least the received touch input into local input that an operating system (OS) of the local computing device is able to natively process if the first translation profile is accessible to the local computing device and maps the touch action to local input, wherein the translation profile maps the touch input to a mouse or keyboard input that emulates the result of the touch input, and wherein the application translation profile for the application in focus is one of a plurality of application translation profiles, each application translation profile in the plurality having a corresponding application;
translate, based on a general translation profile associated with the OS, at least the received touch input into local input the OS is able to natively process if the OS is not able to natively process touch input and no translation profile for the application in focus is accessible, wherein the plurality of application translation profiles have priority over the general translation profile; and
provide the touch input to the OS without use of the plurality of application translation profiles and without use of the general translation profile if no translation profile for the application in focus is accessible and the OS is able to natively process touch input.

7. The local computing device of claim 6, wherein the instructions, when executed, further cause the processor to:
receive touch input from both the remote computing device and at least one other remote computing device in the same format;
identify the application in focus at the time of the touch event in response to receiving the touch input from the remote computing device; and
determine that the application translation profile for the identified application in focus is accessible to the local computing device if the first translation profile is included among the plurality of application translation profiles, the plurality of application translation profiles stored at the local computing device.

8. The local computing device of claim 7, wherein:
the plurality of application translation profiles includes another translation profile for another application of the local computing device;
each of the plurality of application translation profiles includes a mapping of at least one touch action to local input; and
the application translation profile for the application in focus and the other application translation profile each map a given touch action to different local input.

9. The local computing device of claim 8, the instructions, when executed, further cause the processor to:
receive a translation profile alteration request specifying one of the plurality of application translation profiles; and
alter the specified translation profile in accordance with the received request.

10. The local computing device of claim 6, wherein the application translation profile for the application in focus includes a mapping of a given touch action to local input implementing a macro for the application associated with the first translation profile.

11. The local computing device of claim 8, the instructions, when executed, further cause the processor to:
provide, if the application translation profile for the application in focus is accessible to the local computing device and maps the touch action to command input, the command input to which the touch action is mapped in the application translation profile to the application in focus via an application command interface.

12. A method comprising:
providing, to a remote computing device with a network interface of the local computing device, remote display information useable to display at least a portion of a graphical user interface (GUI) of the local computing device;
receiving, with the network interface, touch input indicating a touch event sensed with a touch-sensitive display of the remote computing device when displaying the at least a portion of the GUI;
determining whether an application translation profile associated with an application in focus at the local computing device at the time of the touch event is accessible to the local computing device, wherein the translation profile maps the touch input to a mouse or keyboard input that emulates the result of the touch input, and wherein the application translation profile associated with the application in focus is one of a plurality of application translation profiles, each application translation profile in the plurality having a corresponding application;

translating at least the received touch input into local input the OS is able to natively process, based on the application translation profile if the application translation profile is accessible;

determining whether an operating system (OS) of a local computing device is able to natively process touch input;

generating, from at least the received touch input and a general translation profile associated with the OS, local input the OS is able to natively process if the OS is not able to natively process touch input and no translation profile for the application in focus is accessible to the local computing device, wherein the plurality of application translation profiles have priority over the general translation profile;

providing the touch input to the OS without use of the plurality of application translation profiles and without use of the general translation profile if no translation profile for the application in focus is accessible and the OS is able to natively process touch input.

13. The method of claim 12, further comprising:

receiving, with the network interface, other touch input indicating another touch event sensed with the touch-sensitive display when displaying the at least a portion of the GUI;

determining whether another translation profile associated with another application in focus at the local computing device at the time of the another touch event is accessible to the local computing device;

translating at least the received other touch input into other local input the OS is able to natively process, based on the other translation profile associated with the other application if the translation profile for the other application is accessible; and providing the other touch input to the OS if no translation profile for the other application in focus is accessible and the OS is able to natively process touch input.

* * * * *